United States Patent [19]

Sugawara et al.

[11] 3,771,623
[45] Nov. 13, 1973

[54] LUBRICANT ASSEMBLY FOR SUPPLYING LUBRICANT TO CHAIN LINKS

[75] Inventors: Naoyuki Sugawara, Kawasaki-shi; Junji Yamada, Odawara-shi; Takeshi Yamate, Yokohama; Tadashi Yoshikawa, Fujisawa-shi, all of Japan

[73] Assignees: Tokyo Shibaura Denki Kabushiki Kaisha (aka Tokyo Shibaura Electric Co., Ltd.), Kanagawa-ken; Ishikawajima Harima Jyukogyo Kabushiki Kaisha (aka Ishikawajima Harima Heavy Industries Co., Ltd.), Tokyo-to, Japan; part interest to each

[22] Filed: Nov. 9, 1971

[21] Appl. No.: 197,040

Related U.S. Application Data

[63] Continuation-in-part Ser. No. 843,992, July 23, 1969, abandoned.

[30] Foreign Application Priority Data

July 30, 1968  Japan.................................. 43/53380
July 30, 1968  Japan.................................. 43/53381

[52] U.S. Cl.............................................. 184/15 A
[51] Int. Cl.............................................. F16n 7/00
[58] Field of Search.................. 184/15 R, 15 A, 2, 184/3

[56] References Cited
UNITED STATES PATENTS

| | | | |
|---|---|---|---|
| 2,920,720 | 1/1960 | Hemsley | 184/15 |
| 2,998,865 | 9/1961 | Geissler | 184/15 |
| 2,990,916 | 7/1961 | Hillard et al. | 184/15 |
| 2,684,733 | 7/1954 | Freiman | 184/15 |
| 1,933,464 | 10/1933 | West et al. | 184/2 |

*Primary Examiner*—Manuel A. Antonakas
*Attorney*—Robert E. Burns

[57] ABSTRACT

A lubricant assembly comprises a main cylinder, a main piston assembly reciprocal within the main cylinder, a secondary cylinder connected to the main piston assembly, and a secondary piston assembly reciprocal within the secondary cylinder and having a conical nozzle portion engageable with a chain link lubricant fitting. The main and secondary piston assemblies define between them a lubricant chamber and the secondary piston assembly is provided with a lubricant passage for communicating the lubricant chamber with the conical nozzle portion. The main and secondary piston assemblies are mounted for movement together as an integral unit during a first stage of operation in response to pressurized fluid applied to a working face portion of the main piston assembly to effect movement of the nozzle portion of the secondary piston assembly into engagement with the chain link fitting which is to be lubricated. The main piston assembly then undergoes further movement relative to the secondary piston assembly to diminish the volume of the lubricant chamber and accordingly force the lubricant contained therein through the lubricant passage and out through the nozzle portion into the chain link lubricant fitting. Spring means are provided for effecting return movement of the main and secondary piston assemblies to their initial positions upon completion of the lubricant operation and after the pressurized fluid is relieved from behind the working face of the main piston assembly. The main cylinder is mounted upon resilient members which function to absorb any lateral impulsive forces applied to the secondary piston assembly in the event the nozzle portion of the secondary piston assembly is not truly axially aligned with the intended lubricant fitting.

10 Claims, 5 Drawing Figures

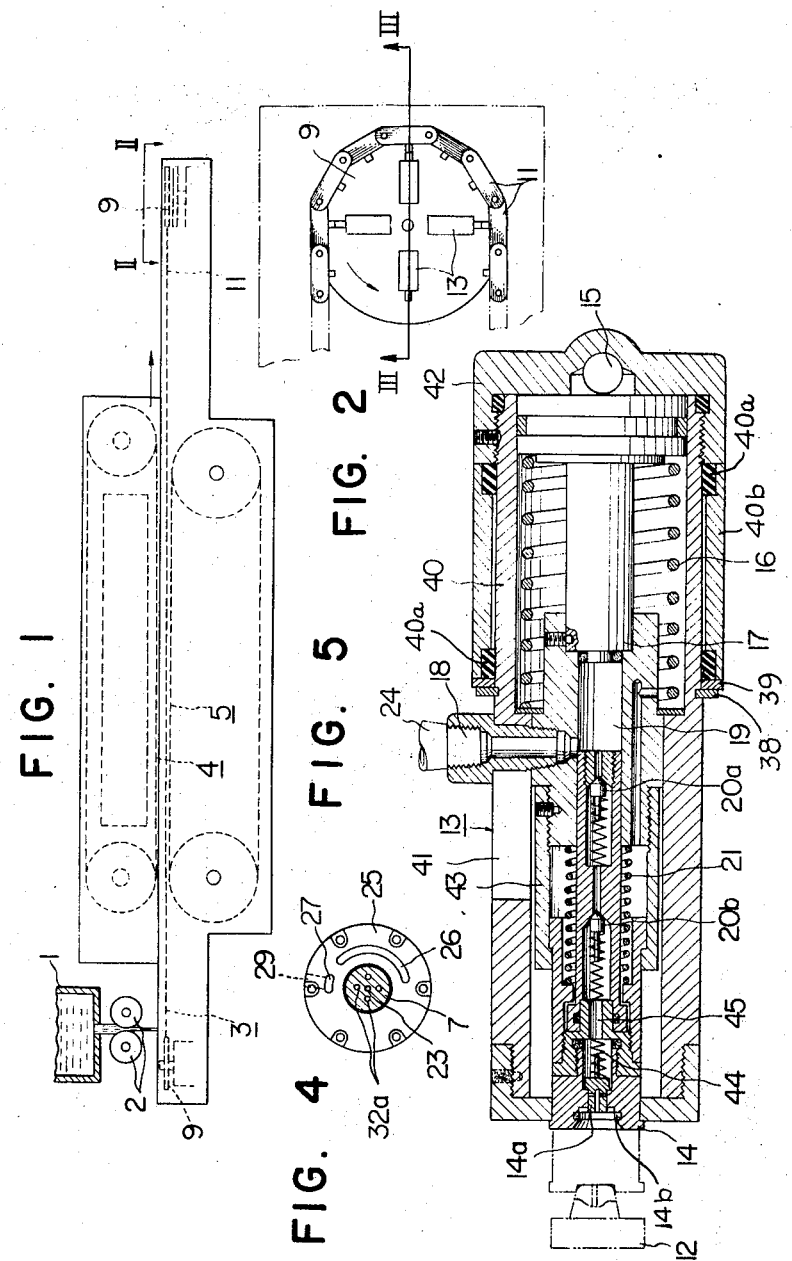

LUBRICANT ASSEMBLY FOR SUPPLYING LUBRICANT TO CHAIN LINKS

This application is a continuation-in-part application of application, Ser. No. 843,992, filed July 23, 1969 and now abandoned.

The present invention relates to automatic lubricant supplying apparatus for automatically effecting lubrication of chain links and more particularly, the present invention pertains to a lubricant assembly incorporated in a glass bulb blowing apparatus.

It has been the conventional practice in the glass bulb blowing art to effect lubrication of a series of chain plate links making up the molten glass conveying means by either supplying drops of lubricant from a position exteriorly of the machine or by filling each plate link element of the chain with lubricant during assembly or inspection and maintenance of the plate link. These prior art methods are disadvantageous since an inadequate amount of lubricant is oftentimes supplied to the plate links and moreover, such lubricating techniques are frequently carried out on an irregular basis resulting in an incomplete lubrication of the plate links.

As a result of such defective and deficient lubricating techniques, the series of plate links frictionally rub against each other resulting in abrasion of various parts of the plate links. Abrasion of the plate links causes slack to form in the chain of plate links and such detrimentally affects the synchronous operation of the glass bulb blowing apparatus. As a result, these drawbacks seriously affect the quality of the bulbs manufactured by the glass bulb blowing apparatus.

It is therefore a primary object of the present invention to provide a lubricant assembly capable of uniformly supplying lubricant to a chain of connected together chain links.

It is another object of the present invention to provide a plurality of lubricant assemblies which operate in synchronism with the advancement of the chain links to automatically effect lubrication of each chain link during advancement of the chain of plate links through the glass blowing apparatus.

It is a further object of the present invention to provide a lubricant assembly which only discharges lubricant when the assembly is in engagement with the chain link and thereby prevents a wasteful dispersion of lubricant.

It is a still further object of the present invention to provide a lubricant assembly having means for absorbing impulsive forces applied to the assembly in the event the chain link lubricant fitting is not axially aligned with the lubricant assembly.

The foregoing objects of the present invention are achieved by providing a lubricant assembly composed of a main cylinder mounted along the path of travel of the chain plate links and movable in synchronization with the advancement of the plate links, a main piston assembly reciprocal within the main cylinder, a secondary cylinder mounted within the main piston assembly, nected for movement with the main piston assembly, and a secondary piston assembly reciprocal within the secondary cylinder and having a nozzle portion extensible into engagement with a lubricant fitting provided on the chain plate links. The main and secondary piston assemblies coact together to define a lubricant chamber therebetween and the piston assemblies are mounted for movement together as an integral unit during a first stage of operation to engage the nozzle portion of the secondary piston assembly with the desired lubricant fitting and then the main piston assembly is further moved relative to the secondary piston assembly during a second stage of operation to force the lubricant contained within the lubricant chamber through a nozzle passage provided in the secondary piston assembly and out through the nozzle portion into the lubricant fitting of the plate link.

The foregoing objects and other objects and characteristic features of the present invention will become apparent upon a reading of the following specification and claims when taken in conjunction with the accompanying drawings, wherein the same reference characters denote the same or equivalent structure in the various figures, and wherein:

FIG. 1 is a side view of a glass bulb blowing apparatus embodying the lubricant assemblies of the present invention;

FIG. 2 is an enlarged plan view of a plurality of lubricant assemblies taken along the line II—II in FIG. 1;

FIG. 4 is a horizontal cross-section taken along the line IV—IV in FIG. 3; and

FIG. 5 is a longitudinal cross-section of a lubricant assembly constructed in accordance with the principles of the present invention.

Figure 3:
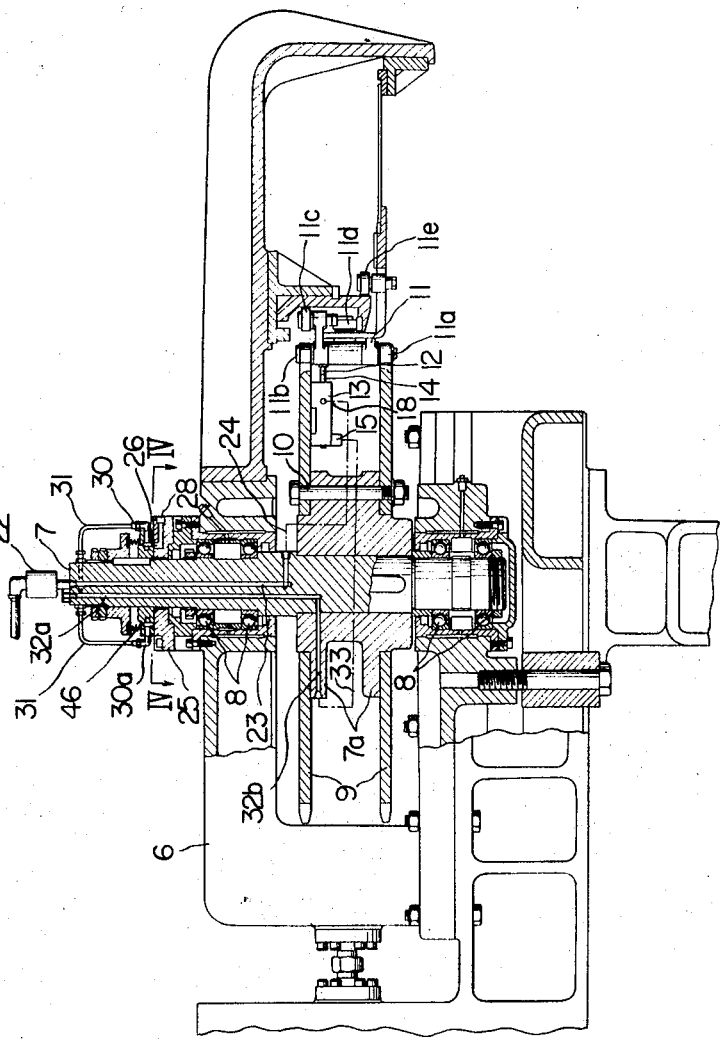
FIG. 3 is an enlarged cross-section taken along the line III—III in FIG. 2 and also includes therein a distributing valve assembly.

FIG. 1 shows a glass bulb blowing apparatus of the type known as a "ribbon machine" wherein glass is melted in a melting furnace 1 and discharged between a pair of feed rollers 2 onto a conveying apparatus 3 composed of a series of connected together plate links. As seen in FIG. 2, the plate links 11 are connected together in a chain and the chain is wound around a pair of carrier wheels 9 which cooperate together to advance the links through the glass blowing apparatus. The glass blowing apparatus includes a blow head apparatus 4 and a mold link apparatus 5 each disposed on opposite sides of the chain and the blow heads and the cooperating molds are well known in the art and thus are shown in schematic form only.

During operation, the molten glass is pressed into a flat ribbon of molten glass by the feed rollers 2 and deposited on the links. The plate links advance the flat glass ribbon between the blow head apparatus and the mold link apparatus whereupon the molten glass is automatically formed into glass bulbs.

The structure for supplying lubricant to each lubricant assembly is shown in FIG. 3 and comprises a supporting frame 6 having rotatably therein a rotatable shaft 7. The rotatable shaft 7 is rotatably mounted in a vertical position by means of a set of upper ball bearings 8 and a set of lower ball bearings 8. A hub member 7a is rigidly connected to the lower portion of the rotatable shaft 7. One rotatable carrier wheel 9 is connected to the hub member 7a and as shown in FIG. 3, this carrier wheel 9 is composed of upper and lower toothed sprockets which are clamped to the hub member 7a by means of clamping members 10.

Each of the plate links includes a plurality of rollers 11a, 11b, 11c, 11d and 11e which guide the links around the carrier wheels 9. The rollers 11a and 11b engage with the sprocket teeth of the carrier wheel 9 and the rollers 11c and 11d and 11e make rolling contact with guide members connected to the support frame 6. Also connected to the inside portion of each link 11 is a lubricant fitting 12 and lubricant received in the lubricant fitting 12 is delivered through lubricant pipes (not shown in the drawings) disposed interiorly of the plate links to suitably lubricate the links.

Disposed interiorly of the rotatable shaft 7 is a lubricant path 23 which communicates at one end with a rotary joint 22 and at the other end with a series of flexible conduits 24 (shown in dashed lines). The rotary joint 22 is connectable to a source of lubricant and the flexible conduits 24 are connected to respective lubricant ports 18 provided in each lubricant assembly. During operation, the lubricant is fed through the rotary joint 22, the lubricant path 23, through the respective flexible conduits 24 and then into the various lubricant assemblies 13.

Rigidly connected to the supporting frame 6 is a valve plate or disc 25. Arcuate grooves 26 and 27 are formed in the upper surface of the disc 25, such as shown in FIG. 4, the arcuate groove 26 is in communication with a compressed air supply or inlet port 28 whereas the arcuate groove 27 is in communication with an exhaust or outlet port 29 which extends radially outwardly from the disc 25 and opens to the atmosphere and functions as an exhaust port for the compressed air.

A valve ring 30 is connected to the rotatable shaft 7 and is mounted for axial sliding movement along the rotatable shaft 7. The valve ring 30 is mounted above the stationary valve disc 25 and the lower surface of the valve ring 30 is biased into contact with the upper surface of the valve disc 25 by means of a biasing spring 46. The biasing spring 46 is positioned between the valve ring 30 and a plate portion connected to the rotatable shaft 7.

A series of angularly spaced-apart holes 30a are provided in the lower surface of the valve ring 30 and the holes 30a are positioned to successively communicate with the arcuate grooves 26 and 27 provided in the valve disc 25 during rotation of the rotatable shaft 7. Each of the holes 30a is connected to one end of a pipe 31 and the other end of the pipes 31 are connected to and are in fluid communication with a series of vertical air paths 32a which axially extend along the rotatable shaft 7. The air paths 32a communicate with radially extending air paths 32b provided in the hub member 7a and each air path 32b communicates with a compressed air supply-and-exhaust port 15 provided in each lubricant assembly 13 by means of a flexible pipe 33 (shown in dashed lines).

During operation of the glass blowing apparatus, the rotatable shaft and the valve ring 30 rotate together as an integral unit while the valve ring 30 is biased into contact with the stationary valve disc 25. Compressed air supplied to the supply port 28 flows into the arcuate groove 26 and then flows successively into the holes 30a provided in the valve ring 30 whenever the holes 30a pass over the arcuate groove 26. The air then flows through the respective pipes 31, air paths 32a, 32b, the flexible pipes 33 and then successively into the compressed air ports 15 provided in the lubricant assemblies 13.

In a similar fashion, when the holes 30a successively pass over the arcuate exhaust grooves 27, the compressed air previously supplied to the respective lubricant assemblies 13 is exhausted to the atmosphere by flowing back through the same passages except in this instance, the air flows through the exhaust groove 27 and out the radial exhaust port 29. No air is supplied to or exhausted from the lubricant assemblies during the time period in which the holes 30a pass over the solid portion of the upper surface of the valve disc 25 other than those surface portions containing the arcuate grooves 26 and 27. In other words, the operation of the lubricant assemblies is suspended during these periods. In this manner, the valve ring 30 cooperates with the stationary valve disc 25 to function as an air distributing valve for actuating the lubricant assemblies 13.

Now the lubricant assemblies 13 will be described in detail with reference to FIG. 5. Each lubricant assembly 13 comprises a main cylinder 40, a main piston assembly 17 mounted for reciprocal movement within the main cylinder 40, a secondary cylinder 43 connected to the main piston assembly 17, and a secondary piston assembly 14 mounted for reciprocal movement within the secondary cylinder 43 and having a conical nozzle portion engageable with the plate link lubricant fittings 12.

The main cylinder 40 has a peripheral groove in its outer surface and a ring 38 is secured in the peripheral groove. Another ring 39 is slidably fitted over the outer surface of the main cylinder 40 and frictionally engages with the annular ring 38. The main cylinder 40 is threadably engaged with a cylindrical cap member 42 mounted upon one of the carrier wheels 9 which functions as a support for the lubricant assemblies, such as shown in FIG. 2. The cap member 42 is provided therein with the compressed air supply-and-exhaust port 15.

A pair of annular resilient members 40a are interposed between the main cylinder 40 and a cylindrical side wall portion 40b of the cylindrical cap member 42. The annular ring 39 is not fixed to either the annular ring 38 or the cylindrical side wall portions 40b but instead, is slidably positioned between these two members. The annular resilient members 40a function as force absorbing means and resiliently support the main cylinder 40 as well as the main piston, the secondary cylinder, and the secondary piston and the members 40a have sufficient resiliency or elasticity to ensure that the lubricant assembly can engage with the lubricant fittings 12 without suffering undue stress even under those conditions when the nozzle portion of the secondary piston is not in true axial alignment with the lubricant fitting. In other words, the resilient members 40a effectively absorb any lateral impulsive forces transmitted to the secondary piston in the event the secondary piston is slightly offset relative to the chain link lubricant fitting 12 and prevents the impulsive forces from being transmitted to the supporting structure, such as the carrier wheel 9.

The main piston assembly 17 is slidably mounted within the main cylinder 40. The main piston assembly comprises a main piston member terminating at the righthand portion, as seen in FIG. 5, in a disc member having a fluid working face and terminating in the lefthand portion in the secondary cylinder 43. The secondary cylinder 43 comprises a cylindrical sleeve threaded onto the end portion of the main piston member.

A lubricant fitting 18 is connected to the main piston member and is connected to one of the flexible pipes 24. The main cylinder 40 is provided with a slot 41 through which the lubricant fitting 18 extends and the slot 41 has sufficient length to accommodate the lubricant fitting during the full extent of reciprocal movement of the main piston assembly. The interior portion of the main piston member has a cylindrical lubricant space 19 therein and this space is in communication with the lubricant fitting 18.

The main piston assembly is urged rightwardly in a nonlubricating direction by means of a biasing spring 16 and the main piston assembly is moved in a leftward direction by pressurized fluid supplied through the supply-and-exhaust port 15. The pressurized fluid acts upon the working face of the disc member and the force exerted by the pressurized fluid overcomes the biasing force exerted by the spring 16 thereby effecting leftward movement of the main piston assembly.

The secondary piston assembly 14 is slidably mounted with the secondary cylinder 43. The secondary piston assembly has a cylindrical outer portion which is slidable within the secondary cylinder 43 and a cylindrical center portion which is slidable within the space 19. A biasing spring 21 is disposed interiorly of the secondary cylinder 43 and urges the secondary piston assembly outwardly from the main piston assembly in an extended position. This positional relationship is shown in FIG. 5.

The secondary piston assembly is provided with a longitudinally extending lubricant passage 45 and this passage communicates the lubricant chamber or space 19 with the conical nozzle portion of the secondary piston assembly which extends exteriorly of the main cylinder 40. A nozzle valve 14a is mounted in the nozzle portion of the secondary piston assembly and the nozzle valve is movable between a closed position wherein same is seated on the secondary piston assembly thereby closing the lubricant passage and is movable to an open position allowing lubricant to flow through the lubricant passage 45 and out the nozzle portion of the secondary piston assembly. A biasing spring 44 is provided to continuously bias the nozzle valve into the closed position.

The nozzle portion of the secondary piston assembly has a conical opening complementing that of the lubricant fittings 12. An annular sealing ring 14b is fitted within the conical opening and functions to maintain a sealing engagement between the secondary piston assembly 14 and the lubricant fitting 12 during lubrication of the plate links. Also provided within the lubricant passage 45 are a pair of check valves 20a and 20b which function to allow lubricant flow only from the lubricant chamber 19 to the conical nozzle opening and these check valves effectively prevent a reverse flow of the lubricant.

The operation of the lubricant assembly 13 will now be described with reference to FIG. 5. The main and secondary piston assemblies normally are in the position shown in FIG. 5 whereupon the center portion of the secondary piston assembly 14 defines with the main piston assembly 17 a variable volume lubricant chamber 19. Lubricant is supplied through the flexible piping 24 and is delivered through the lubricant fitting 18 into the lubricant chamber 19 wherein the lubricant is temporarily stored. As the plate links 11 move in synchronism with the rotating carrier wheel 9 and reach a predetermined position, the distributing valve supplies compressed air to the air supply-and-exhaust port 15 to effect movement of the main piston assembly in a leftward direction.

During the initial advancement of the main piston assembly, the secondary piston assembly 14 moves as an integral unit with the main piston assembly 17 and the secondary piston assembly is extended from the main cylinder 40 until the conical nozzle opening engages with the lubricant fitting 12 provided on one of the plate links and in this position, the conical lubricant fitting 12 presses against and opens the nozzle valve 14a. During this first stage of operation, the lubricant chamber 19 retains its initial size and no lubricant is forced through the lubricant passage 45.

After the secondary piston assembly 14 engages with the plate link to be lubricated, the main piston assembly 17 further advances relative to the stationary secondary piston assembly due to the application of pressurized fluid acting on the working face of the disc member of the main piston assembly. As a result, the main piston assembly 17 continues to move leftwardly thereby diminishing the volume of the lubricant chamber 19 and accordingly forcing or squeezing the lubricant contained within the chamber 19 through the axial lubricant passage 45, past the check valves 20a and 20b and out through the now opened nozzle valve 14a. In this manner, a predetermined amount of lubricant is supplied to the plate link.

As the carrier wheel 9, the chain plate links 11 and the distributor valve continue to move in synchronism, the distributor valve sequentially terminates the supply of compressed air to the supply-and-exhaust port 15 and then communicates the port 15 with the exhaust port 29 whereupon the compressed air is relieved from behind the working face of the main piston assembly. As the pressurized air is exhausted from the main cylinder 40, the biasing springs 16 and 21 return the piston assemblies 17 and 14 to their initial positions shown in FIG. 5. Then lubricant is again delivered into the lubricant chamber 19 whereupon the lubricant assembly is ready to perform another lubricating function.

The distributor valve is designed to effect extension of the secondary piston assembly 14 only after a plate link 11 is in position on the carrier wheel 9 to be lubricated and to retract the secondary piston assembly from the plate link after sufficient time has been alloted to discharge the lubricant from the lubricant chamber 19 into the appropriate plate link. Thus the arcuate supply groove 26 is much longer than the arcuate exhaust groove 27 since the compressed air must be delivered to the lubricant assemblies for a sufficient time duration to enable the lubricant contained within each lubricant chamber 19 to be discharged to the appropriate plate link.

In the event the conical nozzle portion of the secondary piston assembly is not perfectly aligned with the link plate lubricant fitting 12, the engagement of these two members may transmit impulsive forces to the secondary piston assembly 14. Since the secondary piston assembly slides into and out of the main cylinder 40 and is in close contact therewith, these impulsive forces are transmitted to the main cylinder 40. In order to avoid undue vibration and possible fracture of the components in the event of such a misalignment, the resilient members 40a are provided and these members effectively absorb slight lateral movements of the main cylinder 40 whereupon the conical nozzle opening can engage with the lubricant fitting 12 without unduly stressing the lubricant assembly.

By such a construction, each plate link of the chain link assembly is automatically and repetitively lubricated. Although one embodiment of the present invention has been described with respect to chains formed of plate links, the principles of the present invention may be applied to effect lubrication of other types of chain links.

In accordance with the present invention, each plate link is in contact with the carrier wheel 9 though an angle of approximately 180° and therefore ample time is provided in which to adequately lubricate each plate link.

Furthermore, the lubricant assembly of the present invention is only operative to supply lubricant in response to actual engagement of the lubricating assembly with the plate link which is to be lubricated. Therefore there is no possibility of dispersing lubricant unless the lubricant assembly is in actual engagement with a lubricant fitting.

What we claim and desire to secure by Letters Patent is:

1. In combination: a chain of connected together chain links each having a lubricant fitting and movable along a given path of travel; and a lubricant assembly for supplying lubricant to said chain links comprising a main cylinder, movable support means supporting said main cylinder along the path of travel of said chain for rotational movement in synchronism with the movement of said chain, a piston assembly having at one end a nozzle portion configured to releasably engage with the chain link lubricant fittings, means mounting said piston assembly for axial reciprocal movement within said main cylinder accompanied by reciprocal movement of said nozzle portion into and out of a lubricating position wherein same is capable of engaging with said chain link lubricant fittings, means defining a lubricant passage within said piston assembly opening at one end into said nozzle portion, means for effecting axial reciprocal movement of said piston assembly in synchronism with the movement of said chain to move said nozzle portion into and out of engagement with said chain link lubricant fittings comprising a piston working face on said portion assembly and means responsive to the rotational movement of said movable support means for supplying pressurized fluid to said working face including means defining a passage to said main cylinder movable with said support means, an inlet port stationary with respect to said movable support means and connectable during use to a source of pressurized fluid, an outlet port stationary with respect to said movable support means and connectable during use to an exhaust, and a valve plate stationary with respect to said movable support means and having first means periodically alignable with said passage in response to the rotational movement of said passage to provide communication between said inlet port and said passage and having second means periodically alignable with said passage in response to the rotational movement of said passage to provide communication between said outlet port and said passage, and wherein said first means includes means defining an aperture in said valve plate having an arcuate length establishing proportionally with respect thereto the desired time period during which said nozzle portion is in said lubricating position, lubricant supply means operative only when said nozzle portion is in engagement with one of said chain link lubricant fittings to supply lubricant serially through said lubricant passage and out said nozzle portion into a chain link lubricant fitting, and force absorbing means for absorbing impulsive forces laterally applied to said nozzle portion during engagement thereof with said chain link lubricant fittings due to axial misalignment therebetween thereby effectively preventing said impulsive forces from being transmitted to said support means.

2. A combination according to claim 1; including sealing means mounted on said nozzle portion for sealing the engagement of said nozzle portion with respective ones of said chain link lubricant fittings.

3. A combination according to claim 1; wherein said force absorbing means comprises at least one resilient member interposed between said main cylinder and said support means having sufficient resiliency to absorb said impulsive forces.

4. A combination according to claim 1; wherein said support means comprises a rotatable carrier wheel rotatable in synchronizm with the movement of said chain links, and a hollow cylindrical cap member rigidly connected to said carrier wheel and having disposed therein an end portion of said main cylinder, and wherein said force absorbing means comprises at least one annular resilient member interposed between said hollow cylindrical cap member and said main cylinder and having sufficient resiliency to effectively absorb said impulsive forces.

5. A combination according to claim 1; wherein said lubricant supply means includes a nozzle valve disposed in said lubricant passage movable between an open position allowing lubricant flow and a closed position preventing lubricant flow, spring means biasing said nozzle valve into said closed position, and wherein said nozzle valve is positioned relative to said nozzle portion to enable engagement of said nozzle portion with a chain link lubricant fitting to effect opening of said nozzle valve.

6. A combination according to claim 1; wherein said means mounting said piston assembly comprises a main piston assembly mounted to undergo axial reciprocal movement within said main cylinder and having two opposed end portions, a secondary cylinder connected to and reciprocally movable with one end portion of said main piston assembly, and wherein said first-mentioned piston assembly is mounted to undergo axial reciprocal movement within said secondary cylinder, and wherein said means for effecting axial reciprocal movement of said piston assembly comprises biasing means normally biasing said first-mentioned piston assembly and said main piston assembly in axially spaced-apart relationship, spring means urging said main piston assembly in a direction away from said lubricating position, and means for effecting axial movement of said first-mentioned piston assembly and said main piston assembly together as a unit in a direction towards said lubricating position to effect engagement of said nozzle portion with a chain link lubricating fitting.

7. A combination according to claim 6; wherein said lubricant supply means includes means defining a variable volume lubricant chamber between said first-mentioned and main piston assemblies in communication with said lubricant passage and receptive of a lubricant, and means for effecting further axial movement of said main piston assembly relative to said first-mentioned piston assembly after said nozzle portion is in engagement with a chain link lubricant fitting by overcoming said biasing means to diminish the volume of said variable volume lubricant chamber accompanied by forcing the lubricant contained therein through said lubricant passage into the chain link lubricant fitting engaged with said nozzle portion.

8. In combination: a chain link having a lubricant fitting; and a lubricant assembly for supplying lubricant to the chain link lubricant fitting comprising a main cylinder, a main piston assembly mounted to undergo axial reciprocal movement within said main cylinder and having two opposed end portions, a secondary cylinder connected to and reciprocally movable with one end portion of said main piston assembly, a secondary piston assembly mounted to undergo axial reciprocal movement within said secondary cylinder and having a nozzle portion configured to engage with said chain link lubricant fitting, means defining a variable volume lubricant chamber between said main and secondary piston assemblies receptive of a lubricant during use of the lubricant assembly, means defining a lubricant passage within said secondary piston assembly providing communication between said nozzle portion and said lubricant chamber, biasing means normally biasing said main and secondary piston assemblies in axially spaced-apart relationship whereby said lubricant chamber has its maximum volume, spring means urging said main piston assembly in a nonlubricating axial direction away from said chain link lubricant fitting, means for effecting axial movement of said main and secondary piston assemblies together as a unit in a lubricating direction to engage said nozzle portion with said chain link lubricant fitting and for thereafter effecting further axial movement of said main piston assembly relative to said secondary piston assembly by overcoming said biasing means to diminish the volume of said variable volume lubricant chamber accompanied by forcing the lubricant contained therein through said lubricant passage into said chain link lubricant fitting engaged with said nozzle portion; and means disposed around said main cylinder for absorbing lateral impulsive forces applied by said chain link lubricant fitting to said secondary piston assembly whenever same engages with said chain link lubricant fitting in an axially misaligned condition.

9. A lubricant assembly according to claim 8; including sealing means mounted on said nozzle portion for sealing the engagement of said nozzle portion with said chain link lubricant fitting.

10. A lubricant assembly according to claim 8; wherein said means for effecting axial movement of said main and secondary piston assemblies in said lubricating direction comprises a piston working face on said main piston assembly, and means for supplying pressurized fluid to said piston working face to effect axial movement of main and secondary piston assemblies.

* * * * *